March 3, 1931. E. BERNET ET AL 1,795,244
POWER TAKE-OFF FOR MOTOR VEHICLES
Filed Nov. 21, 1929
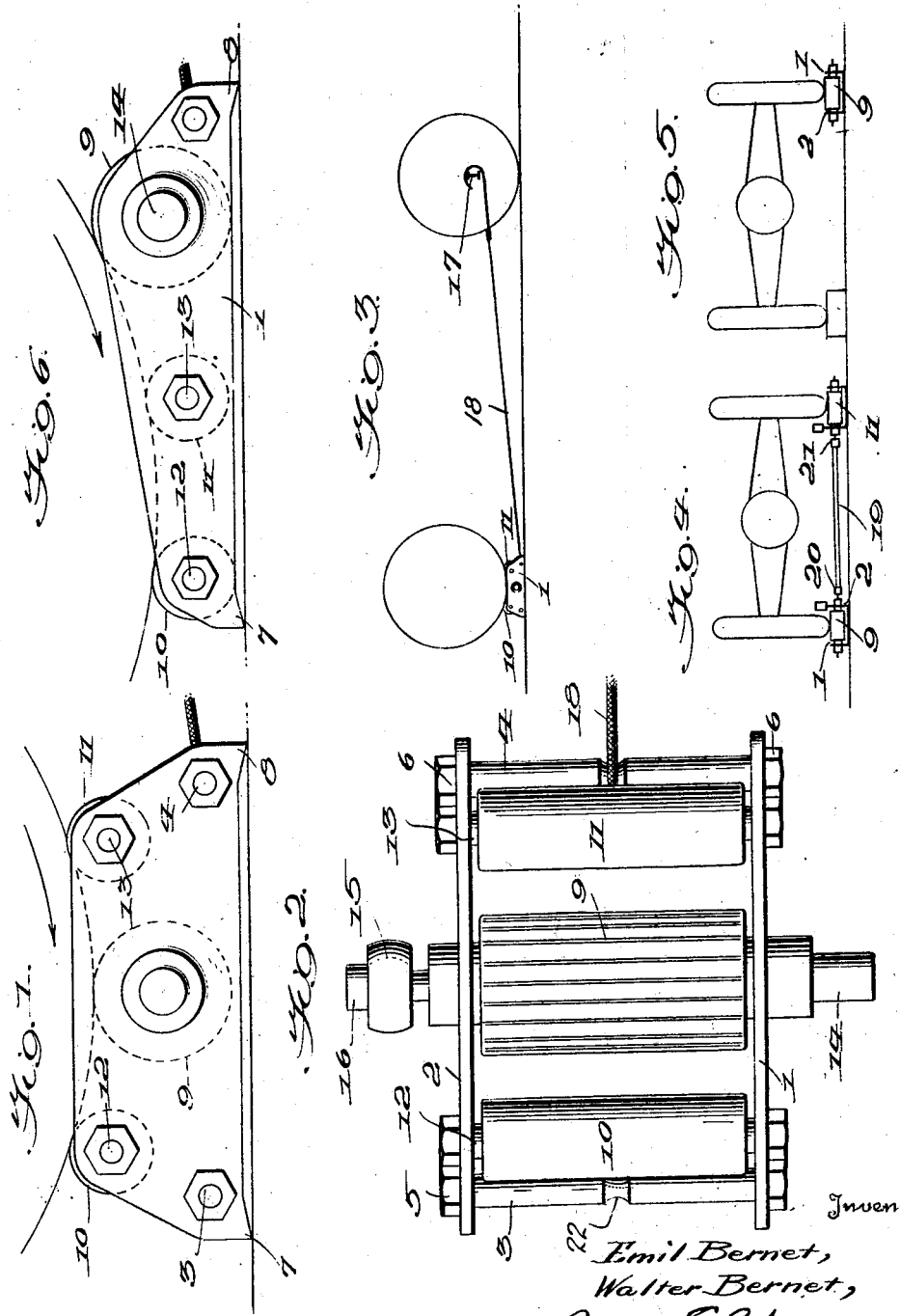

Patented Mar. 3, 1931

1,795,244

UNITED STATES PATENT OFFICE

EMIL BERNET AND WALTER BERNET, OF RIO DE JANEIRO, BRAZIL

POWER TAKE-OFF FOR MOTOR VEHICLES

Application filed November 21, 1929, Serial No. 408,797, and in Brazil August 21, 1929.

The present invention has reference to power take-off or transmitting means, and relates more specifically to a device for taking off power from one or both of the power-driven wheels of motor vehicles and for transmitting the derived power to other mechanism, and the particular object of the invention is to provide a readily portable device of this character, which is simple in construction, cheap in manufacture, not liable to get out of order, and which can be used with practically any make of motor vehicle by simply placing it under one or both driven vehicle wheels, and securing it in place in suitable manner, as will now be particularly described, in connection with the accompanying drawing, in which Fig. 1 is a side elevation of our improved power take-off; Fig. 2 is a top view thereof; Fig. 3 illustrates diagrammatically the manner in which the device is operatively attached to a power chassis; Figs. 4 and 5 are rear end views of a one-wheel and a two-wheel take-off respectively, and Fig. 6 is a side view of a modification.

Our improved take-off device comprises in its simplest one-wheel type a metal frame and a plurality of rollers, preferably three, journaled in this frame, as shown in Figs. 1 and 2, in which the frame is formed by the side members or cheeks 1 and 2, which are rigidly connected by the spacer stay-bolts 3 and 4 with end nuts 5 and 6 respectively. The cheeks may have any suitable shape, but preferably the substantially trapezoidal conformation shown in Fig. 1, and the bottom edge of each cheek may be slightly curved, as clearly shown in Fig. 1, presenting sharp biting ends 7 and 8 for securely anchoring the contrivance in place on the ground. A large roller 9 is journaled at its ends in the cheeks, and two smaller rollers 10 and 11 are similarly journaled laterally of the large central roller and in a higher horizontal plane. The shafts 12 and 13 serve as stay bolts to enhance the rigidity of the frame, and all three rollers, or only the large one, as desired, may run on ball bearings. The larger center roller is preferably roughened or fluted to give the imposed driving wheel a good purchase. The width of these rollers must be greater than the operative tread of the largest vehicle wheel to be used on the power take-off. The diameter of the largest roller normally should be about one-tenth that of the driving wheel, so that the driven roller 9 then has ten times the operative speed of the driving wheel.

The power transmitted from the vehicle wheel is then taken off from the roller shaft 14 in any suitable manner. The shaft for instance may be rigidly coupled to a driving shaft of the mechanism to be driven, or a small pulley 15 may be mounted on the shaft stump 16 for belt drive. To prevent the take-off from becoming relatively dislodged under operation, it may be temporarily secured to the front axle 17 of the vehicle by means of a hook-ended rope or chain 18, as shown in Fig. 3, whose inner end may be adjustably secured to the roller frame, preferably to the middle portion of the respective front cross-bolt 4 (Fig. 2).

Fig. 5 shows a one-wheel take-off device, the other wheel of the vehicle being suitably elevated. In Fig. 4 is shown a two-wheel power take-off, the roller shaft either extending solidly through the two roller frames, or an intermediate shaft 19 being intercoupled at 20 and 21 to the respective roller shaft stumps, to adapt the contrivance to vehicles of different widths.

In the modification according to Fig. 6, the large roller 9 is mounted near one end of the frame, and the two smaller rollers are journaled toward the other end, which makes for a lower frame construction.

The end cross-bolts are channeled as at 22, for preventing the rope to slip sidewise on the bolt. Obviously, the take-off device may also be rigidly mounted on a stationary bed plate or be spiked directly to the ground, instead of being portable, as shown.

By means of this contrivance any motor driven vehicle may be converted at once and at any place into a stationary power plant for the operation of various kinds of machinery, especially for farm use, and the operative speed of the drive is readily controlled through the vehicle motor to suit different requirements.

What we claim is:—

1. In a power take-off for motor vehicles of the character set forth, a roller frame, comprising two rigidly joined bearing cheeks, adapted to be placed under a power driven wheel of the vehicle, rollers journaled in the frame in an arc substantially corresponding to that of the supported power wheel, a power shaft extending from one of said rollers, and means for keeping the roller frame in its relative operative position, and the respective ends of the roller frame cheeks being of ground-entering conformation.

2. In a power take-off for motor vehicles, a roller frame adapted to be placed under a power driven wheel of the vehicle in contact with the wheel tread, comprising substantially trapezoidal cheeks, and spacer bolts connecting these cheeks, a large power receiving roller journaled in said frame, a power transmitting shaft for said large roller extending beyond at least one of the frame cheeks, two smaller wheel-supporting idling rollers journaled in said frame, and the three said rollers being arranged in the arc of a circle to properly contact with the tread of the superimposed vehicle wheel, the underedge of the frame cheeks being concaved to respectively present front and rear ground gripping ends, and means for preventing relative longitudinal slippage of the frame under operation, comprising a flexible member, adapted to be one-endedly adjustably secured to the roller frame and its other end temporarily securable to a fixed front member of the vehicle chassis.

EMIL BERNET.
WALTER BERNET.